Sept. 6, 1960   E. A. HERIDER ET AL   2,951,383
ADJUSTABLE ACTUATOR
Filed April 26, 1956
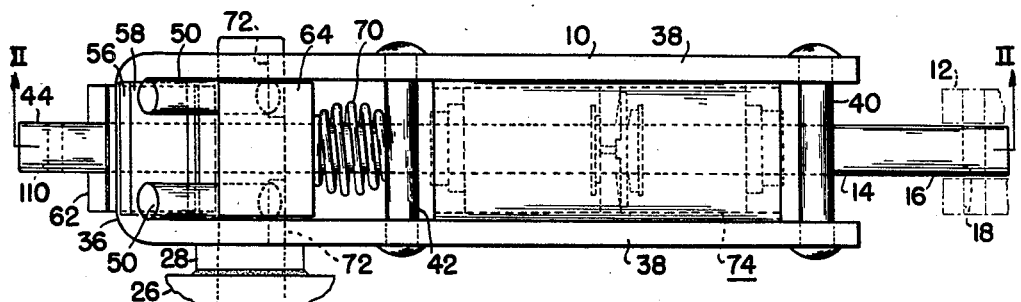
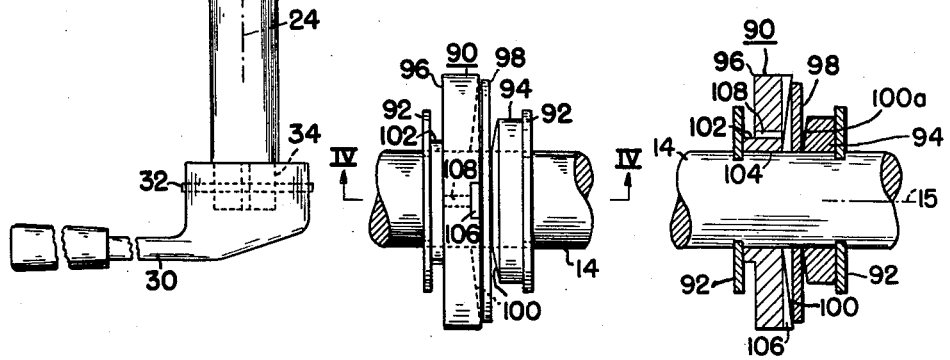
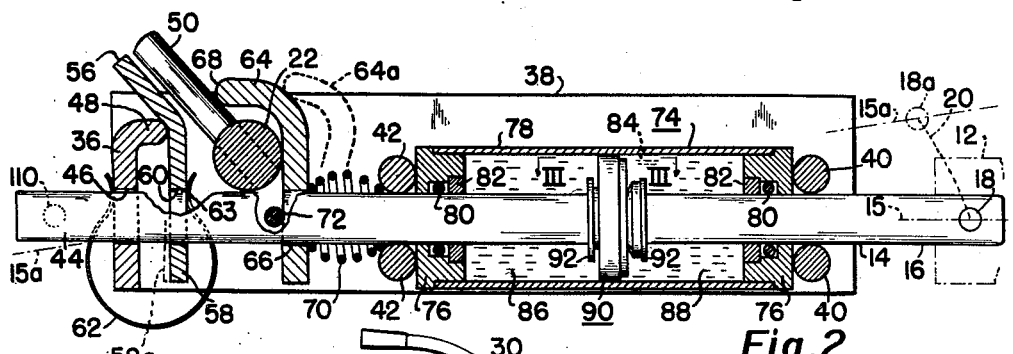
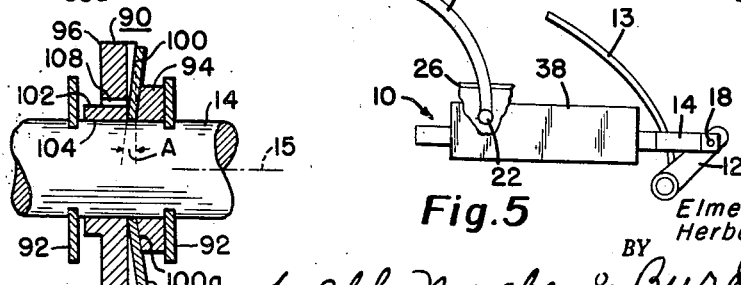
INVENTORS.
Elmer A. Herider
Herbert A. Friesen
BY
Webb, Mackey & Burden
THEIR ATTORNEYS

United States Patent Office 2,951,383
Patented Sept. 6, 1960

2,951,383

ADJUSTABLE ACTUATOR

Elmer A. Herider, Dearborn Township, Wayne County, and Herbert A. Friesen, Centerline, Mich., assignors to Rockwell-Standard Corporation, a corporation of Pennsylvania Filed Apr. 26, 1956, Ser. No. 580,835

14 Claims. (Cl. 74—169)

The present invention relates to a manual actuator for adjusting a load-sustaining part. This actuator is particularly useful to operate individual lifting or torque applying mechanisms for raising adjustable windows, seat cushions, vertical seat tracks and the like in vehicles and more specifically, it finds ready application as an actuator to adjust the spring rate of a sinuous spring cushion of the general type shown in copending Herider et al. application, Serial Number 586,551, filed May 22, 1956, now U.S. Patent No. 2,818,105. Briefly described in its application in adjusting the spring load of the latter patent, the actuator has a positioning rod operable in tension if connected at one end or under compression at the other to overcome the static or shifting force of the load being sustained. The rod passes through a set of gripper plates provided in the actuator. A shaft having a control handle provided in the actuator can be selectively manually rocked back and forth over a given path to reciprocate one plate thereby driving the rod carrying the load or manually rocked in another path to tilt another plate and unlock the rod and release the load. A hydraulic damper of novel construction in the actuator prevents uncontrolled descent of the load when the last-mentioned plate unlocks to release the rod.

Accordingly a primary object of this invention resides in the provision of a novel manual actuator for adjusting the position of a connected load sustaining structure.

A further object resides in providing a novel actuator for adjusting a load sustaining structure including a slide rod connected to the structure with drive mechanism for the rod, a releasable locking mechanism for the rod and a manual control common to both mechanisms, the slide rod also having connected thereto a device which damps movement of the rod in a direction under the force of the load sustaining structure when the locking mechanism is released. In conjunction with this object it is a further object to provide a slide rod damping device in which the damping action is automatically increased responsive to an increase in magnitude of the load structure biasing force.

Further novel features and other objects of this invention will become apparent from the following detailed description, discussion and the appended claims taken in conjunction with the accompanying drawings showing a preferred structure and embodiment, in which:

Figure 1 is a plan view of the actuator,

Figure 2 is a longitudinal section in side elevation along the lines II—II of Figure 1, Figure 3 is a fragmentary detail of the relatively movable piston parts viewed from the lines III—III of Figure 2, and Figures 4 and 4A are sections taken along the lines IV—IV of Figure 3, with Figure 4 showing the passage through the piston open, and Figure 4A showing it closed, and Figure 5 is a reduced scale side elevational view illustrating the connection of the actuator of this invention between a seat support and a spring biasing crank arm somewhat as shown in the aforementioned U.S. Patent No. 2,818,105.

In more particular reference to Figures 1, 2 and 5 of the drawings, an actuator 10 is shown for use in adjustably positioning a load sustaining crank element 12, for instance, a spring load 13 (Figure 5) of the above indicated type. For this purpose the actuator 10 has a cylindrical control rod or shaft 14 sliding lengthwise on the axis 15 therein and having a protruding end portion 16 thrusting against and pivotally pinned at 18 to the element 12. The element 12 may be constrained to simple rectilinear or else curvilinear paths under load and in its most general case as illustrated, the element 12 rotates in a path of swing indicated by an arc 20 about a corresponding horizontally disposed, fixed crank axis or else a shifting center of rotation, not shown. In this general case the longitudinal axis 15 of the actuator has a tilting movement from its heavier lined position of Figure 2 into various dotted line positions as illustrated by the dotted lines 15a, 18a and to accommodate this movement, the actuator has a rock shaft 22 supporting it at one end to swing about the fixed horizontal axis 24 of the rock shaft.

A vehicle seat frame 26 or other structure with parts to be adjusted has a sleeve bearing 28 welded thereto which carries an intermediate portion of the rock shaft 22 adjacent the rock shaft end portion swingably supporting the actuator 10. At its opposite end the rock shaft 22 carries an operating handle lever 30 pinned at 32 to a terminal 34 of square cross section. A one-piece U shaped frame for the actuator 10 has an end plate 36 connected by means of bent junctures to a relatively long pair of parallel side legs 38. At their free ends the side legs 38 are connected together by means of a pair of vertically spaced guide rivets 40 and intermediate their ends the legs 38 are further interconnected by means of another pair of spaced guide rivets 42. The rod 14 fits between the rivets of each guide pair 40, 42 and protrudes at its rear end portion 44 through a circular opening 46 formed in the base 36 of the actuator frame. The base 36 has a rounded inturned portion 48 at its upper edge.

Between the side legs 38 of the frame, the rock shaft 22 caries a spaced pair of short transversely extending fingers 50. When the shaft 22 is rocked counterclockwise from the neutral position shown in Figure 2, the fingers 50 engage the tip end 56 of an angle plate 58 whose bent midportion fulcrums about the stationary inturned lip 48. The angle plate 58 has a lower leg formed with a circular shaft opening 60 receiving the rod 14 so as to permit it to slide therethrough at all times in the direction of the loaded part 12. A U shaped spring 62 formed from one-inch strip spring stock has an aligned pair of circular shaft openings 63 in its opposite legs which likewise slidably receive the rod 14. The opposite legs of the spring 62 respectively engage the base 36 of the actuator frame and the lower leg of the angle plate 58 adjacent the shaft opening 60 therein. The spring 62 tends to rock the angle plate 58 clockwise to a position 58a as viewed in Figure 2 about the fulcrum 48 so as to cause plate 58 having the shaft opening 60 therein to tilt and bind the rod 14 against movement in a direction away from the controlled part 12. Counterclockwise rotation of the handle 30 as viewed in Figure 2 causes the fingers 50 to rock the lower leg of the plate 58 into a vertical plane whereupon the rod will freely slide both ways through the shaft opening 60.

Another angle plate 64 has a circular shaft opening 66 in one leg thereof which slidably receives the rod 14 and the other leg is bent at right angles to the first leg and has the tip 68 thereof adjacent the fingers 50. A pair of axially spaced pins 72 secured to the legs 38 limits movement of the plate 64 in one direction. A coil spring 70 is trapped between the pair of guide rivets 42 and the plate 64 and holds the plate 64 with its apertured leg in a vertical plane whereby the rod 14 will freely slide both ways in the aperture 66 thereof.

Rocking movement of the fingers 50 clockwise from the position shown in Figure 2 causes the angle plate 64 to tilt and simultaneously move from the stationary pins 72 and in the direction of its dotted line position 64a against the action of the coil spring 70. The tilting phase of the motion of the plate 64 causes the rod 14 to bind in the opening 66 of plate 64 so as to move conjointly with the plate to its advanced position 64a. When pressure on the handle 30 is released, the spring 70 returns the plate 64 to the solid line position shown in Figure 2 and the angle plate 58 prevents any return movement of the rod 14.

A cylindrical hydraulic damper 74 is located between the pairs of guide rivets 40, 42. The damper 74 includes a pair of end sealing members 76 which are welded or otherwise secured fluid tight to the opposite ends of a steel tube 78 to form a closed cylinder. The members 76 slidably receive the rod 14 and are each counterbored in two places adjacent the rod to receive an O-ring seal 80 for the rod and a press-fitted seal retainer 82. The steel tube 78 is charged with a body 84 of hydraulic fluid such as oil and is divided into a control chamber 86 at one end of the cylinder and a reservoir chamber 88 at the other end by means of reciprocating piston structure generally indicated at 90. The piston structure 90 is slidable on the rod 14 between two spaced snap ring stops 92 secured in grooves to the rod. The piston structure 90 consists of a small diametered beveled stop part 94 engaging one snap ring, a piston 96 of larger diameter engaging the other snap ring and an intervening spring disk 98 of intermediate diameter which elastically separates the two parts 94 and 96. The piston and stop parts 96, 94 have confronting beveled surfaces 100 and 100a which are substantially complementary to one another and the spring disk 98 engages the beveled surface on the piston part 96 at its outer margin and at its inner margin the spring disk 98 engages the beveled surface on the stop part 94. The disk 98 functions as a combined flat Belleville washer and plate valve and is oil tempered and shot blasted to improve the properties of its spring steel composition for these dual functions.

In one physically constructed embodiment of the invention the parts employed had the following approximate dimensions and surface angularity:

Control shaft 14—⅜" O.D.
Shaft openings 46, 60 and 66—.003" greater than ⅜" O.D.
Piston part 96—1" O.D.
Spring disk 98—.034–.035" thick.
Plate 58—⅛" thick.
Plate 64—³⁄₁₆" thick.
Convexity of beveled surface 100a on stop part 94— 7° taper.
Concavity of beveled surface 100 in piston part 96— 6° taper.
Stroke of reciprocating plate 64—⅜".

In reference to Figures 4 and 4A which more particularly show the piston structure 90, the piston part 96 has a slightly thickened hub portion 102 protruding from the working face thereof and arranged concentrically with a cylindrical bore 104 on which the piston part 96 slides in limited relative movement to the rod 14 along the axis 15. The concave beveled surface 100 in the piston part 96 has a pair of shallow rectangular radial slots 106 extending in opposite directions in a plane normal to the axis 15. The piston part 96 has a single axially extending transfer passage 108 leading from a point on the working face outside the hub portion 102 to a point of intersection with the beveled surface 100 adjacent the juncture of the latter with the floor of one of the slots 106. In its relaxed position, Figure 4, the spring disk 98 occupies a transverse plane parallel to the plane of the slots 106. In this position the inner periphery of the spring 98 engages the stop part shown at 94 in Figure 4 at the small end of its beveled surface 100a.

As previously noted, the spring disk 98 has a smaller diameter than the piston part 96 and the slots 106 in the latter lead under the outer edges of the disk to provide for the free transfer of fluid past the spring disk 98 in both directions. In one physically constructed embodiment of the invention the transfer passage 108 was approximately .040 inch in diameter and readily accommodated the hydraulic fluid being displaced between the ends of the steel tube 78 during movement of the piston structure 90 therein at a slow rate. At a higher rate in a direction tending to accumulate pressure on the working face of the piston part 96, the piston 96 progressively slides on the rod 14 toward the fixed stop 94, bending the spring 98 into the dished position of Figure 4A in which it deflects about the stop part at an angularity of approximately 6 or 7 degrees out of its own plane as indicated at A. In such deflected position of the spring disk 98, the inner periphery thereof completely blocks the transfer passage 108 and the only fluid in the tube 78 transferred past the piston part 96 is through leakage between this part and the walls of the steel tube 78. Decreasing pressure on the working face of the piston part 96 enables the elastic spring disk 98 to straighten and progressively reopen the passage 108. Thus the control rate of the piston structure 90 is such that its resistance to movement varies directly with the magnitude of load urging it to move or in other words the spring disk 98 restricts the transfer passage 108 to control the rate of fluid escape and rate of retrograde movement of the loaded rod 14 in inverse relationship to trapped fluid pressure and therefore inversely to load.

In operation of the actuator 10 of the preceding figures, the operating handle lever 30 is manually oscillated to oscillate the fingers 50 clockwise. The fingers 50 and the spring 70 therefore reciprocate the angle plate 64 between its solid line position and its dotted line position 64a in Figure 2 to repetitively draw the rod 14 through the self-locking angle plate 58 and advance the rod in short strokes in the direction of the element 12. When the fingers 50 remain in their idle position, the locking plate 58 is urged by the strip spring 62 to bind against and lock the rod 14 against any retrograde movement in the direction away from the load-connected element 12. On the other hand, the handle lever 30 can be selectively rocked in the opposite direction from its idle position. In such case, the fingers 50 push the tip 56 of the locking plate 58 to tilt it from the dotted line locked position 58a, Figure 2, into the vertical position shown by solid lines in which it allows the rod 14 to slide freely through the opening 60 therein.

In operation of the damper 74, as the rod 14 moves in a direction toward the element 12 the hydraulic fluid freely transfers from the reservoir chamber 88 through the piston structure 90 and into the control chamber 86 and any pressure which tends to accumulate in the reservoir chamber 88 readily dissipates itself through the transfer passage 108 in the piston part 96. On the other hand when the rod 14 is unlocked in the actuator 10 and allowed to give way to the element 12 in the opposite direction, the resultant rapid movement causes the pressure on fluid trapped in the control chamber 86 to accumulate and react against and cause relative shift of the piston part 96 on the rod 14 in the direction of the companion stop part 94 thereby elastically deflecting the spring disk 98. With increasing pressure the spring disk 98 further deflects, progressively closing the transfer passage 108 to an ultimate point at which it may fully block the passage 108 as in Figure 4A. Accordingly, the hydraulic drag produced by the piston structure 90 considerably stiffens under the motion of high loads and the entire movement thereafter permitted depends solely on the minor rate of leakage between the piston part 96 and the steel tube 78. Thus any chance of an uncontrolled runaway of the part 12 due to excessive loads thereon is prevented by the novel action of the damper 74. Moreover, the elastic connection which the spring disk 98 affords between the relatively movable piston 96 and the piston rod 14 tends to soften any jolt or jarring effect that the load may tend to cause.

It is apparent that the element 12 may be readily connected to either end portion of the rod 14, for instance, to the opposite end 44 through a pivot receiving opening 110 therein in which case the end portion 44 will act in tension to pull against the load rather than acting in compression as the opposite end portion 16 presently does in thrusting against the load. It is further evident that in addition to horizontal or inclined disposition as illustrated, the actuator 10 may be employed to advantage when arranged with its axis 15 vertically disposed and with either end portion 16 or 44 of the rod 14 protruding upwardly depending on whether the actuator has to draw or to push a depending load upwardly or else force a counter-balanced load downwardly. Self-evidently, the actuator is useful in any of the foregoing dispositions in association with a crank to become a highly effective torque applying device.

While we described certain presently preferred embodiments of our invention, it is to be understood that it may be otherwise embodied within the scope of the following claims.

We claim:

1. A control comprising a reciprocable member adapted to be connected to a part positionable under load, spaced plates having openings loosely receiving the member and independently tiltable between a position of one-way binding engagement with the member and a neutral position in which the member freely slides each way through the plates, means to restrain one plate against bodily shifting movement and urging it into a normally tiltably engaged position with the member to prevent slipping movement of the same under force of the load, a hydraulic dashpot connected for movement with the member for controlling its rate of retrograde movement in dependence upon the escape rate of a body of trapped hydraulic fluid in the dashpot, means in the dashpot defining an escape passage for the trapped fluid and including a pressure sensitive valve part restricting said passage to control the rate of fluid escape and rate of retrograde movement of the member in inverse relationship to trapped fluid pressure and thereby inversely to load, and a common control member for relatively reciprocating said plates through a normal range of motion and movable beyond that range to tilt said one plate and release the rod to move under the hydraulic control of said dashpot.

2. A control for positioning a loaded part, comprising a supported frame, a rockshaft passing transversely through and supporting the frame, longitudinally spaced guides in the frame, a controlling rod for positioning said part and slidably received in the guides in the frame, a dashpot trapped between the guides in surrounding relation to the controlling rod, a dashpot piston connected to slide with the rod within the dashpot and capable of limited relative movement upon the rod, a dashpot valve sensitive to the aforesaid limited movement of the piston to adjust the resistance of the dashpot in correspondence to rate of retrograde movement of the rod, a lock plate in the frame releasably engageable with the rod to prevent retrograde movement thereof, a drive plate in the frame reciprocable to engage the rod on one stroke to advance the same and to release the rod and return without it on the return stroke, single selective means to release the lock plate or to reciprocate the drive plate and advance the rod, comprising a lever between the plates rockable by the rockshaft to shift the lock plate and release the rod to retrograde movement under hydraulic control of said dashpot piston or to shift the drive plate into driving engagement and conjoint movement of advance with the rod.

3. Shaft-operated torque applying means forming an extensibly and retractively moving connection suspended between crank element means and a fixed location spaced therefrom, said torque applying means comprising the combination, with a rotatable crank element having a fixed axis, of: a support bearing at said point, an operating shaft concentric to said bearing and journalled in said support bearing to rock on a fixed axis; an actuator frame having transversely arranged bearing openings therein receiving the operating shaft for swinging movement of the frame about said fixed axis of and about said operating shaft; a longitudinal actuator shaft slidable in the frame and connected to rotate said crank element, and reciprocable means including abutment means rockable one way with the operating shaft to drive the actuator shaft longitudinally in successive stages in one direction for rotating said crank element under torque in a corresponding direction of rotation.

4. Shaft-operated torque applying means forming an extensibly and retractively moving connection suspended between crank element means and a fixed point spaced therefrom, said torque applying means comprising the combination with a rotatable crank element having a fixed axis; of a support bearing at said point, an operating shaft concentric thereto and journalled therein to rock on a fixed axis in different arcs, an actuator frame having transversely arranged bearing openings therein receiving the operating shaft for swinging movement of the frame about said fixed axis of and independently to the operating shaft, a longitudinal control shaft slidable in the frame and connected to rotate said crank element, reciprocable means including abutment means rockable one way with the operating shaft to drive the control shaft longitudinally in successive strokes in one direction for rotating said crank element under torque in a corresponding direction of rotation, and releasing lock means including said abutment means rockable another way with the operating shaft to unlock the control shaft for releasing it and the crank element to respectively slide and rotate in the corresponding opposite direction.

5. An actuator comprising a reciprocable member adapted to be connected to an element to be moved under load, relatively stationary and reciprocatory parts to establish one-way holding and driving engagement respectively with said member at spaced points therealong in alternation with one another, said parts adapted to be operatively connected to a reciprocatory drive means controlling same in a forward range of travel so as to drive said member in a forward direction, an operating shaft and abutment means rigidly secured thereto constituting the sole reciprocatory drive means for said reciprocatory part and effective upon reverse movement to release said stationary part holding the member against retrograde movement, and dashpot means connected for movement with said member for controlling its rate of retrograde movement inversely to magnitude of load.

6. In an actuator, a frame having a rod slidable therein and having first and second gripper plates mounted therein loosely receiving the rod in their untilted positions and selectively tiltable and untiltable to grip and release the rod respectively, means to pivot the first gripper about a fixed location in the frame, biasing means which continuously urges the first gripper into its tilted locked position, dashpot means connected for movement with said rod for hydraulically controlling its rate of retrograde movement inversely to magnitude of load, and means for reciprocating the second gripper to advance the rod by steps during successive forward strokes of reciprocation and constructed and arranged to pivot the second gripper into tilted locked position on the rod throughout each such stroke, said last-named means constituting a common selector member having a forward range of travel through which it oscillates for operating said second gripper and advancing said rod during alternate strokes whereas said first gripper locks said rod during each remaining stroke and otherwise, and having a reverse position in which it forces the first gripper to untilt so as to release the rod to move under the hydraulic control of said dashpot means.

7. Connection linkage of the character described so as to provide for crank-to-crank motion, said linkage comprising the combination of fixed support bearing means, an operating shaft journalled in said support bearing means and extending coaxially at each end beyond the corresponding end of the support bearing means, a uni-control hand crank fast to the shaft on one end extension thereof, a crank element rotatable about a fixed axis spaced apart from said operating shaft axis, a frame mounted to the other end extension of said operating shaft, said shaft constituting the sole means of supporting said frame for rotation about the shaft axis, a rod movable substantially longitudinally in two directions in said frame, said crank element being pivotally connected at its free end to the outer end portion of said rod and constituting the sole means of support thereof, said rod and frame having operative connection means interposed to complete a force transmitting path therethrough from said hand crank to said crank element, including spaced apart pin means on said shaft engageable with spaced position adjusting mechanical means connected to said rod to move and to hold said crank element in rotated positions thereof corresponding to the longitudinally mechanically adjusted positions of the rod with respect to said frame.

8. In a device of the character described: a rigid frame: a horizontally disposed hydraulic cylinder mounted therein having end closure members at the opposite ends; toothless ratchet plate means mounted in said frame including at least one vertically disposed drive plate adjacent one of said closure members and formed with a rod aperture and at least one vertically disposed release locking plate with a rod aperture; a piston rod passing through and carrying a damper piston between said cylinder end closure members, so as to oscillate said damper piston therebetween and extending therebeyond for projection through the rod apertures in said plates for attachment to a pivoting thrust element; said piston rod having an uninterrupted surface so as to present a smooth interface of contact for engagement within said plate apertures; and fluid tight seals between said rod and each of said closure members for preventing a body of trapped hydraulic fluid within said cylinder from leaking out of the ends of said cylinder; said piston having a resilient connection to said rod and active to control the movement thereof by a braking action which is materially reduced when said rod is moved in one direction incident to release of said locking plate, as compared to braking action produced by movement of said rod in the other direction by said drive plate.

9. Seat spring adjusting mechanism comprising: a support means presenting at least one rod bearing opening defining a fixed axis; a supported device having transverse shaft openings therein coaxially arranged to said bearing opening; toothless ratchet plate means mounted in said device including locking and drive plates each provided with a rod aperture; a cylinder mounted on said device and provided with rod aperture seals and a drag piston slidable therebetween; a smooth piston rod having adjacent portions within said plate rod apertures and within said cylinder for connection to said piston and projecting through said seals at the opposite ends of said cylinder; a crank rotated shaft received in said shaft openings having a forward and a reverse range of rotation and operative in said forward range of rotation relative to said device to advance between positions wherein it is engaged with and moves said drive plate to force said drive plate to grip the piston rod with wedged engagement and a position wherein it releases the drive plate to be free of gripping said rod respectively, and operative in said reverse range of rotation to unlock the locking plate so as to be free of gripping said rod; said device having a rigid body of such length that the piston rod extends, at one of its ends, beyond the corresponding ends of the rigid body for positively guided transverse movement of that end of said rigid body, and said rigid body being pivotally mounted about said fixed axis of said shaft to accommodate the position of said rigid body as piston rod moves upward at the extended end and downward at the opposite end and vice versa during operation.

10. An actuator comprising: support structure; toothless ratchet plate means mounted on said structure including at least one locking plate formed with a rod aperture and at least one driving plate formed with a rod aperture; a smooth slide rod slidably fitting through said locking plate and drive plate apertures; means supported by said structure for unidirectionally damping movement of said slide rod having a member and means connecting said member to said slide rod for movement with and limited sliding movement relative to said slide rod; and operating means common to both said locking plate and said driving plate adapted in an operative drive range of movement for engagement with and movement of said driving plate and effective in a reverse range of movement to engage and unlock said locking plate for releasing the slide rod to move against damping action of said damping means.

11. Actuating mechanism to move a component against a unidirectional biasing force comprising: an actuating member adapted to be connected to the component and movable to move the component in opposite directions, one direction being against the biasing force; an operating lever repetitively movable in opposite directions between fixed normal limit positions; means operable to transmit each movement of said operating lever in one direction only to said member so as to incrementally move said member in its said one direction; means normally operative to lock said member against movement in a direction opposite to its said one direction in any of an infinite number of intermediate and final set positions of said member within the limits of the configuration of its path of movement; means operative upon movement of said operating lever beyond one of said normal limit positions to release said member locking means and permit movement of said member in said opposite direction under its biasing force; and unidirectional damping means connected to said member to damp its speed of movement only in said opposite direction.

12. An actuator comprising: support structure; toothless ratchet plate means mounted on said structure including at least one locking plate formed with a rod aperture and at least one driving plate formed with a rod aperture; a smooth slide rod slidably fitting through said locking plate and drive plate apertures; means supported by said structure for unidirectionally damping movement of said slide rod having a movable member connected to said slide rod; operating means common to both said locking plate and said driving plate adapted in an operative drive range of movement for engagement with and movement of said driving plate to drive said rod in one direction and effective in a reverse range of movement to engage and unlock said locking plate for releasing the slide rod to move in the opposite direction against damping action of said damping means; and means in said damping means to automatically increase damping action responsive to an increase in magnitude of biasing force when said rod moves in said opposite direction.

13. In a device of the character described, a frame, toothless ratchet plate means mounted therein including at least one plate comprising a locking plate formed with a rod aperture and at least one plate comprising a drive plate formed with a rod aperture, a smooth slide rod slidably fitting in the apertures in said plates, dashpot chamber means including a drag piston connected to said slide rod and capable of limited sliding movement thereon, and single operating means adapted in an operative drive range of movement for engagement with said drive plate and effective in a reverse range of movement to unlock said locking plate for releasing the slide rod to move under the control of the drag piston.

14. Shaft-operated torque applying means forming an extensively and retractively moving connection suspended between crank element means and a fixed location spaced therefrom, said torque applying means comprising the combination with a rotatable crank element, having a fixed axis defining a relatively offset center of rotation from said fixed location, of: a support bearing at said location, an operating shaft concentric to and journaled in said support bearing to rock on a fixed axis, an actuator frame having transversely arranged bearing openings therein receiving a first end portion of said operating shaft for enabling swinging movement of the frame about the axis of and about said operating shaft, a longitudinal control shaft slidable in said frame, said control shaft having an outer end extending beyond the corresponding end of said frame in all longitudinal positions with respect thereto and having a pin element connecting the outer end of said shaft to pivot on the free end of said crank element with respect to said offset center of rotation, reciprocable means including abutment means rockable one way with said operating shaft to drive said control shaft longitudinally in successive strokes in one direction about said center of rotation, releasing lock means including said abutment means rockable another way with said operating shaft to unlock said control shaft and release it to slide in the opposite direction, and a hand lever fast to said operating shaft on the end portion thereof opposite to the first-named end portion.

References Cited in the file of this patent

UNITED STATES PATENTS

| | | |
|---|---|---|
| 325,411 | Hoagland | Sept. 1, 1885 |
| 644,526 | Laury | Feb. 27, 1900 |
| 1,988,194 | Erlandsen | Jan. 15, 1935 |
| 2,045,027 | Sanford | June 23, 1936 |
| 2,111,192 | Padgett | Mar. 15, 1938 |
| 2,367,346 | Good | Jan. 16, 1945 |
| 2,371,940 | Woodford | Mar. 20, 1945 |
| 2,534,857 | Crewe | Dec. 19, 1950 |
| 2,546,051 | Whisler | Mar. 20, 1951 |
| 2,653,682 | Whisler | Sept. 29, 1953 |
| 2,699,120 | Schweisthal | Jan. 11, 1955 |
| 2,726,802 | Jones | Dec. 13, 1955 |

FOREIGN PATENTS

| | | |
|---|---|---|
| 162,719 | Australia | May 5, 1955 |
| 899,302 | Germany | Dec. 11, 1953 |
| 1,106,930 | France | July 27, 1955 |